US012429194B2

(12) United States Patent
Liu et al.

(10) Patent No.: US 12,429,194 B2
(45) Date of Patent: Sep. 30, 2025

(54) SUSPENSION GRID FRAME LIGHTING APPARATUS WITH FLEXIBLE BRACKET

(71) Applicant: LEEDARSON LIGHTING CO., LTD., Fujian (CN)

(72) Inventors: Youcai Liu, Fujian (CN); Lei Zhang, Fujian (CN)

(73) Assignee: LEEDARSON LIGHTING CO., LTD., Zhangzhou (CN)

( * ) Notice: Subject to any disclaimer, the term of this patent is extended or adjusted under 35 U.S.C. 154(b) by 0 days.

(21) Appl. No.: 18/883,540

(22) Filed: Sep. 12, 2024

(65) Prior Publication Data

US 2025/0084985 A1 Mar. 13, 2025

(30) Foreign Application Priority Data

Sep. 12, 2023 (CN) ......................... 202322476560.1

(51) Int. Cl.

| | |
|---|---|
| ***F21S 8/04*** | (2006.01) |
| ***F21V 17/16*** | (2006.01) |
| ***F21V 23/00*** | (2015.01) |
| ***F21V 23/06*** | (2006.01) |
| ***H05B 47/155*** | (2020.01) |
| ***H05B 47/19*** | (2020.01) |

(52) U.S. Cl.

CPC ............ *F21V 17/164* (2013.01); *F21S 8/043* (2013.01); *F21V 23/001* (2013.01); *F21V 23/008* (2013.01); *F21V 23/06* (2013.01); *H05B 47/155* (2020.01); *H05B 47/19* (2020.01)

(58) Field of Classification Search

CPC .... F21V 21/044; F21V 21/042; F21V 21/041; F21V 21/048; F21V 21/049; F21V 17/18; F21V 17/102; F21S 8/043; F21S 8/04; F21S 8/026

See application file for complete search history.

(56) References Cited

U.S. PATENT DOCUMENTS

| | | | | |
|---|---|---|---|---|
| 3,076,536 A * | 2/1963 | Tinnerman | F16B 7/048 | 403/187 |
| 3,921,253 A * | 11/1975 | Nelson | F16B 2/241 | 248/300 |
| 4,315,611 A * | 2/1982 | Hoop | F21V 21/02 | 248/228.7 |
| 6,260,981 B1 * | 7/2001 | Fiene | F21V 19/0095 | 362/147 |

(Continued)

*Primary Examiner* — Ismael Negron

(74) *Attorney, Agent, or Firm* — LANWAY IPR SERVICES; Chun-Ming Shih

(57) ABSTRACT

A lighting apparatus includes a suspension grid frame, an elastic bracket, a driver module and a light module. The suspension grid frame is configured to be installed to a ceiling. The suspension grid frame defines a light container. The elastic bracket is fixed to the suspension grid frame. The driver module has a sidewall connector. The sidewall connector is configured to hook onto the elastic bracket, such that the driver module is fixed to the suspension grid frame. The sidewall connector remains attached to the elastic bracket unless an external force is applied to deform a portion of the elastic bracket. The light module is configured to be installed into the light container. The driver module is attached to the suspension grid frame prior to installation of the light module into the light container.

18 Claims, 8 Drawing Sheets

(56) References Cited

U.S. PATENT DOCUMENTS 6,341,466 B1 * 1/2002 Kehoe .................... F16B 2/241
52/39
6,540,373 B2 * 4/2003 Bailey .................. F21V 19/002
362/147
7,175,296 B2 * 2/2007 Cok ....................... E04B 9/003
362/147
7,628,367 B2 * 12/2009 Friederich ........... F16M 13/027
248/343
8,314,336 B2 * 11/2012 Liang ................... E04B 9/0464
362/147
8,579,458 B2 * 11/2013 Okamura ............. F21V 21/044
362/148
8,889,984 B2 * 11/2014 Korcz ..................... H02G 3/20
362/147
8,915,636 B2 * 12/2014 Araki ..................... F21V 21/02
362/147
9,341,349 B1 * 5/2016 Moore ................. F21V 23/006
9,388,969 B2 * 7/2016 Doubek ............... F21V 17/164
9,897,305 B2 * 2/2018 Ryder ................. G02B 6/0073
10,330,291 B2 * 6/2019 Nguyen ................. F21V 21/03
10,371,290 B2 * 8/2019 Dafonseca ............... F16B 2/18
10,508,445 B2 * 12/2019 Voellmecke, III ...... E04B 9/006
10,627,058 B2 * 4/2020 Zeng ...................... F21S 8/026
10,697,622 B2 * 6/2020 Duckworth ............. F21S 9/022
10,920,975 B2 * 2/2021 Lax ...................... F21V 29/763
11,495,952 B2 * 11/2022 Anderson ................ H02G 3/20
11,885,461 B2 * 1/2024 Zlotnikov ............ F16M 13/027
11,885,477 B2 * 1/2024 Rashidi Doust ........ F21V 23/04
2011/0239503 A1 * 10/2011 Liao ........................ G09F 9/302
40/550
2023/0126195 A1 * 4/2023 Brobston ............. F16M 13/027
248/317

* cited by examiner

SUSPENSION GRID FRAME LIGHTING APPARATUS WITH FLEXIBLE BRACKET

FIELD

The present invention is related to a lighting apparatus, and more particularly related to a lighting apparatus with a flexible installation design.

BACKGROUND

LED technology, or Light Emitting Diode technology, has undergone tremendous development over the past few decades. Originally used in indicator lights and simple displays, LEDs have evolved to become a leading lighting solution in a wide variety of applications. Their fundamental principle is based on electroluminescence, where a semiconductor emits light when an electric current passes through it. Early LEDs were limited in color and brightness, but advances in material science have significantly broadened their capabilities.

One of the most significant breakthroughs in LED development was the creation of blue LEDs in the early 1990s. This discovery enabled the creation of white light by combining blue LEDs with phosphor coatings. The ability to produce white light opened the door for LEDs to be used in general lighting applications, replacing traditional incandescent and fluorescent light sources. LEDs are now widely used in homes, offices, streetlights, and even in industrial lighting systems.

The energy efficiency of LEDs is one of the primary reasons for their widespread adoption. Unlike incandescent bulbs, which waste a large amount of energy as heat, LEDs are highly efficient, converting most of the electricity they consume into light. This efficiency translates to lower energy consumption and reduced electricity bills, making LEDs an attractive option for both consumers and businesses. Additionally, their long lifespan-often exceeding 25,000 hours-further reduces maintenance costs and the need for frequent replacements.

In terms of environmental impact, LEDs have a clear advantage over traditional lighting technologies. They contain no harmful materials like mercury, which is commonly found in fluorescent bulbs. This makes LEDs safer to handle and dispose of, reducing the risk of environmental contamination. Moreover, their lower energy consumption means they contribute less to carbon emissions, aligning with global efforts to combat climate change.

LEDs have also revolutionized the design of modern lighting devices. Their compact size and low heat output allow for much more flexibility in design compared to traditional bulbs. Designers can now create sleek, minimalistic fixtures that were previously impossible with larger, hotter incandescent or fluorescent lights. LEDs are also easily integrated into smart lighting systems, allowing users to control brightness, color, and even lighting schedules through apps or voice commands.

The ability to adjust the color temperature of LEDs is another feature that has gained popularity. Modern LED bulbs can emit light that ranges from warm, soft tones to bright, daylight-like hues, allowing users to customize the lighting to suit their preferences or needs. This versatility makes LEDs ideal for different environments, from cozy living rooms to brightly lit workspaces.

In recent years, LED technology has also made significant inroads into specialized fields like automotive lighting and horticulture. In cars, LEDs provide brighter, more efficient headlights and taillights, enhancing both safety and aesthetics. In horticulture, LEDs are used in grow lights that can be tailored to provide specific wavelengths of light, optimizing plant growth and energy use.

The entertainment industry has benefited greatly from LED advancements as well. LED displays, from large outdoor billboards to the screens in smartphones and televisions, provide vibrant, high-definition visuals with much lower energy requirements than older technologies like plasma or LCD. In theaters and live events, LED stage lighting is preferred for its ability to change colors and intensity on demand, creating dynamic lighting effects.

Another exciting area of LED development is in the field of human-centric lighting. This concept involves using lighting to support human well-being, by mimicking natural light patterns that can improve sleep, mood, and productivity. LED systems that adjust their brightness and color temperature throughout the day are now being installed in workplaces, schools, and healthcare facilities to promote a healthier environment.

In conclusion, LED technology has not only transformed the lighting industry but has also enabled innovations across various fields. Its energy efficiency, environmental benefits, versatility, and adaptability make it a superior lighting solution that continues to evolve. As new developments and applications emerge, LEDs are expected to remain at the forefront of lighting design for years to come.

Ceiling installations have become the most common choice for light fixtures due to their practical location above human heads. This positioning allows light to evenly illuminate a room, reducing shadows and creating a more uniform distribution of light. Ceiling-mounted lights are especially effective in areas where broad coverage is needed, such as living rooms, offices, and public spaces. With LEDs being so compact and versatile, they have further expanded the design possibilities for ceiling lights, allowing for a wide variety of styles, from flush-mounted fixtures to elaborate chandeliers.

LED technology has made it possible to integrate various lighting features into ceiling installations. For example, recessed lighting, where the fixture is embedded into the ceiling, provides a sleek and modern look while maintaining high levels of illumination. LEDs are ideal for this type of lighting because of their minimal heat output, allowing them to be safely installed in confined spaces. Recessed LED lights are commonly found in kitchens, hallways, and offices, offering a clean and unobtrusive lighting solution.

Ceiling lights are also frequently used in combination with dimmers or smart controls, further enhancing their functionality. Dimmable LED ceiling lights allow users to adjust the brightness according to their needs, whether it's for focused task lighting or a more relaxed ambiance. With the rise of smart home technology, many LED ceiling lights can now be controlled remotely via smartphone apps, voice commands, or preset schedules. This level of control adds convenience and energy savings, as lights can be easily turned off or adjusted when not needed.

The versatility of LED ceiling lights extends to more decorative and statement lighting fixtures as well. Chandeliers and pendant lights, which are often used to enhance the aesthetic of a space, now frequently incorporate LED technology. These fixtures can take advantage of LEDs' ability to emit different colors and brightness levels, offering both functional lighting and eye-catching designs. LED strips are also popular in modern ceiling designs, where they can be installed along edges or coves to create indirect lighting effects that add depth and ambiance to a room.

Ceiling installations also play a critical role in specialized environments like commercial and industrial spaces. In offices, LED panel lights installed in ceilings provide consistent, flicker-free lighting, which is important for reducing eye strain and boosting productivity. In warehouses and factories, high-bay LED lights mounted on ceilings provide powerful illumination for large areas, improving safety and visibility. With their long lifespan and energy efficiency, LED ceiling lights are a cost-effective solution for such demanding environments, requiring less maintenance and offering substantial energy savings over time.

SUMMARY

In some embodiments, a lighting apparatus includes a suspension grid frame, an elastic bracket, a driver module and a light module.

The suspension grid frame is configured to be installed to a ceiling.

The suspension grid frame defines a light container.

The elastic bracket is fixed to the suspension grid frame.

The driver module has a sidewall connector.

The sidewall connector is configured to hook onto the elastic bracket, such that the driver module is fixed to the suspension grid frame.

The sidewall connector remains attached to the elastic bracket unless an external force is applied to deform a portion of the elastic bracket.

The light module is configured to be installed into the light container.

The driver module is attached to the suspension grid frame prior to installation of the light module into the light container.

In some embodiments, the elastic bracket has a first hook part and a second hook part separately attaching the sidewall connector.

In some embodiments, the first hook part includes a first insertion elastic piece and a first limiting elastic piece.

The first insertion elastic piece has a first elastic bending portion, the driver module has a first connection port for the first elastic bending portion to hook into, and after the first insertion elastic piece is hooked with the driver module, the driver module is limited in a first direction and a second direction.

The first limiting elastic piece is connected to the driver module through a first limiting member, constituting a limitation of the driver module in a third direction.

The first direction, the second direction, and the third direction are mutually perpendicular to form a three-dimensional coordinate system.

The structure of the second hook part is the same as the structure of the first hook part, and the light module has a second connection port.

In some embodiments, the first limiting member is a guide band fixed at both ends to the driver module, and the first limiting elastic piece is threaded through the guide band.

In some embodiments, the first limiting member is a fastening screw, the first limiting elastic piece has a first connection hole connected to the fastening screw, and the driver module has a second connection hole connected to the fastening screw.

In some embodiments, the first hook part includes two first insertion elastic pieces and one first limiting elastic piece, and the first limiting elastic piece is located between the two first insertion elastic pieces.

In some embodiments, the first insertion elastic piece and the first limiting elastic piece are in the same plane.

In some embodiments, the second hook part includes two second insertion elastic pieces and one second limiting elastic piece, the second limiting elastic piece is located between the two second insertion elastic pieces. after the second hook part is connected to the light module, the two second insertion elastic pieces and the second limiting elastic piece are arranged on the inner side and outer side of the light module, respectively.

In some embodiments, the second insertion elastic piece is divided into a connection segment and an integrally connected hook-type elastic segment, the connection segment is perpendicular to the second limiting elastic piece and extends in a direction away from the second limiting elastic piece, and the hook-type elastic segment forms a triangular structure with the connection segment.

In some embodiments, the first limiting elastic piece and the second limiting elastic piece form a right angle or are in a 180° plane.

In some embodiments, an antenna is disposed to the suspension grid frame.

The antenna is coupled to the driver module via the elastic bracket.

In some embodiments, a power socket is disposed to the suspension grid frame for detachably connecting to an electronic device.

In some embodiments, a power electrode is disposed on the suspension grid frame.

When the light module is attached to the suspension grid frame, the light module is electrically connected to the driver module via the power electrode.

In some embodiments, a first manual switch is disposed on an external surface of the suspension grid frame.

The first manual switch is electrically connected to the drive module to change a light setting for the driver module to drive the light module.

In some embodiments, the driver module has a driver cable for detachably connected to a light cable of the light module.

In some embodiments, the driver cable has a plug end for coupled to a socket end of the light module.

In some embodiments, a second manual switch is disposed on the driver cable for changing a light setting of the driver module to drive the light module.

In some embodiments, the suspension grid frame has a sliding track for slide the driver module to a lock position to connect to the elastic bracket.

In some embodiments, the suspension grid frame has a signal path for routing a control signal of the driver module to another light module disposed to an adjacent suspension grid frame.

In some embodiments, the light module receives a wireless command to control multiple light modules at the same time.

DETAILED DESCRIPTION

Figure 8:
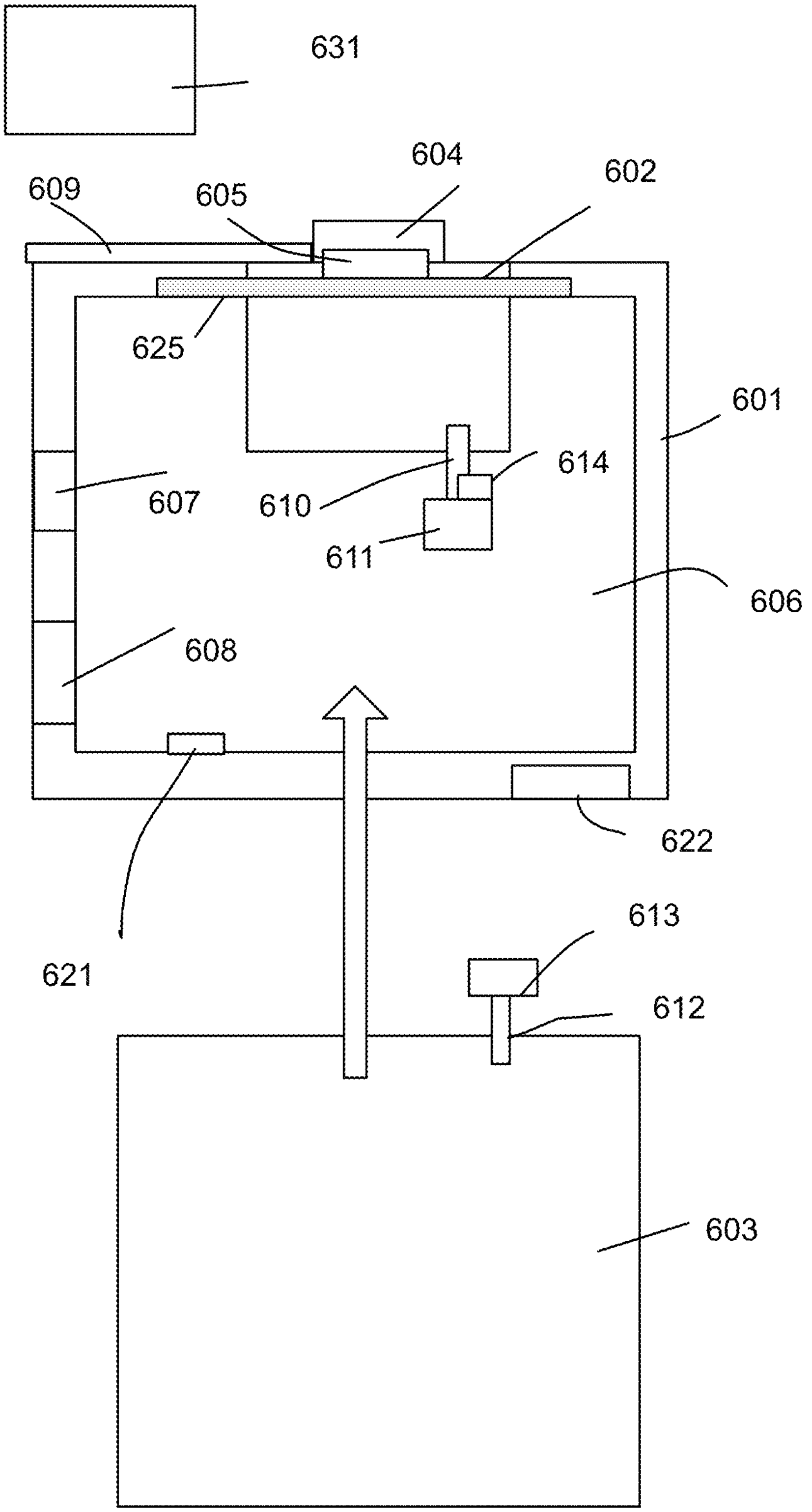
FIG. 8 illustrates another lighting apparatus embodiment.

In FIG. 8, a lighting apparatus includes a suspension grid frame 601, an flexible bracket 604, a driver module 602 and a light module 603.

The suspension grid frame 601 is configured to be installed to a ceiling (now shown, just a common ceiling on top of a room or other places).

The suspension grid frame 601 defines a light container 606.

The flexible bracket 604 is fixed to the suspension grid frame 601.

The driver module 602 has a sidewall connector 605.

The sidewall connector 605 is configured to hook onto the flexible bracket 604, such that the driver module 602 is fixed to the suspension grid frame 602.

The sidewall connector 605 remains attached to the flexible bracket 604 unless an external force is applied to deform a portion of the flexible bracket 604.

The light module 603 is configured to be installed into the light container 606.

The driver module 602 is attached to the suspension grid frame 601 prior to installation of the light module 603 into the light container 606.

In some embodiments, the flexible bracket 604 has a first hook part and a second hook part separately attaching the sidewall connector.

Figure 6:
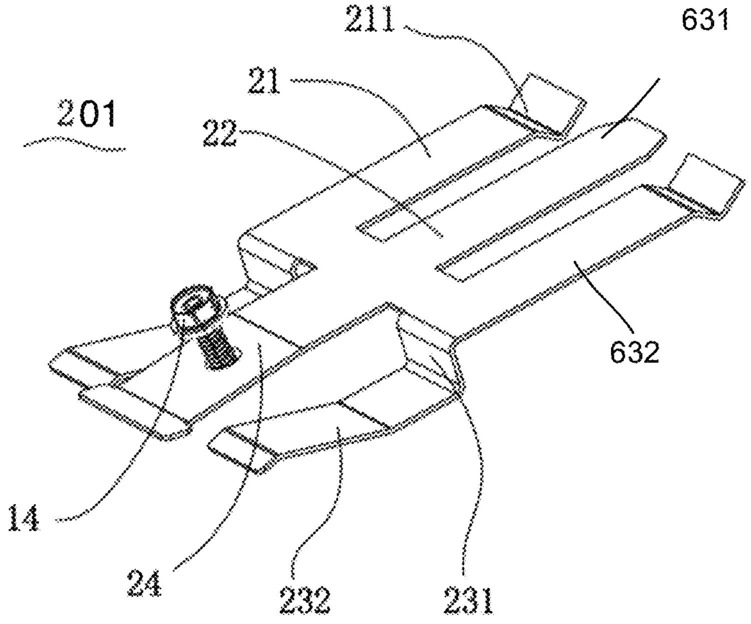
FIG. 6 illustrates another view of the example in FIG. 4.

FIG. 6 shows an example that has a first hook part 631 and a second hook part 632 disposed on an flexible bracket example.

In some embodiments, the first hook part includes a first insertion flexible piece and a first limiting flexible piece.

The first insertion elastic piece has a first flexible bending portion, the driver module has a first connection port for the first flexible bending portion to hook into, and after the first insertion flexible piece is hooked with the driver module, the driver module is limited in a first direction and a second direction.

The first limiting flexible piece is connected to the driver module through a first limiting member, constituting a limitation of the driver module in a third direction.

The first direction, the second direction, and the third direction are mutually perpendicular to form a three-dimensional coordinate system.

The structure of the second hook part is the same as the structure of the first hook part, and the light module has a second connection port.

In some embodiments, the first limiting member is a guide band fixed at both ends to the driver module, and the first limiting flexible piece is inserted into the guide band.

In some embodiments, the first limiting member is a fastening screw, the first limiting flexible piece has a first connection hole connected to the fastening screw, and the driver module has a second connection hole connected to the fastening screw.

In some embodiments, the first hook part includes two first insertion flexible pieces and one first limiting flexible piece, and the first limiting flexible piece is located between the two first insertion flexible pieces.

In some embodiments, the first insertion flexible piece and the first limiting flexible piece are in the same plane.

In some embodiments, the second hook part includes two second insertion flexible pieces and one second limiting flexible piece, the second limiting flexible piece is located between the two second insertion flexible pieces, after the second hook part is connected to the light module, the two second insertion flexible pieces and the second limiting flexible piece are arranged on the inner side and outer side of the light module, respectively.

In some embodiments, the second insertion flexible piece is divided into a connection segment and an integrally connected hook-type flexible segment, the connection segment is perpendicular to the second limiting flexible piece and extends in a direction away from the second limiting flexible piece, and the hook-type flexible segment forms a triangular structure with the connection segment.

In some embodiments, the first limiting flexible piece and the second limiting flexible piece form a right angle or are in a 180° plane.

In FIG. 8, an antenna 607 is disposed to the suspension grid frame 601.

The antenna 607 is coupled to the driver module 602 via the flexible bracket 605.

In some embodiments, a power socket 608 is disposed to the suspension grid frame 601 for detachably connecting to an electronic device.

In some embodiments, a power electrode 621 is disposed on the suspension grid frame 601.

When the light module 603 is attached to the suspension grid frame 601, the light module 603 is electrically connected to the driver module 602 via the power electrode 621.

In some embodiments, a first manual switch 622 is disposed on an external surface of the suspension grid frame 601.

The first manual switch 622 is electrically connected to the driver module 602 to change a light setting for the driver module 602 to drive the light module 603.

In some embodiments, the driver module 602 has a driver cable 610 for detachably connected to a light cable 612 of the light module 603.

In some embodiments, the driver cable 610 has a plug end 611 for being coupled to a socket end 613 of the light module 603.

In some embodiments, a second manual switch 614 is disposed on the driver cable 610 for changing a light setting of the driver module 602 to drive the light module 603.

In some embodiments, the suspension grid frame has a sliding track 625 for sliding the driver module to a lock position to connect to the flexible bracket 604.

In some embodiments, the suspension grid frame has a signal path 609 for routing a control signal of the driver module to another light module 631 disposed to an adjacent suspension grid frame.

In some embodiments, the light module receives a wireless command to control multiple light modules at the same time.

Please refer to FIG. 1 to FIG. 7 for an explanation of the driver module installation structure provided by this utility model. The driver module installation structure includes: a separate light module 3 and driver module 1, where the driver module 1 is detachably connected to the light module 3 through an flexible bracket 2; the flexible bracket 2, 201 have a first hook part for connecting to the driver module 1 and a second hook part for connecting to the light module 3.

The driver module installation structure provided by this utility model features a separate design for the light module 3 and driver module 1, connected by flexible bracket. When connecting the driver module to the light module, one can first insert the first hook part into the driver module, then insert the second hook part into the light module, thus connecting the driver module and light module together. The fixation of the driver module to the light module is simple and convenient, allowing for two-handed wiring and cable management operations, followed by the installation of the entire light fixture. This simple and convenient installation process greatly reduces the time required to install the lighting fixture, to some extent reducing labor costs.

The separate design of the light module 3 and driver module 1, connected by the flexible bracket 2, 201 means that the light module 3, driver module 1, and flexible bracket 2, 201 are all independent components. When packaging, only a box based on the height of the light module 3 is needed. The placement of the driver module 1 can utilize the space in the light module 3's design structure to compensate for part of the space occupied by the driver module 1, reducing the overall height after stacking the light module 3 and driver module 1. This reduces the height of the packaging box, thereby lowering packaging material costs and reducing packaging expenses. It also reduces the volume of the packaging box, decreasing the space occupied by the packaging box and lowering transportation costs.

The advantages of the modular light fixture also bring great convenience to its installation. Specifically: (1) The driver module 1 can be produced independently as a component, and the light module 3 and driver module 1 do not need to be assembled together. The light module 3 part is not affected by the production of the driver, improving the production efficiency of the light module 3, reducing the number of assembly workers for the light fixture, thereby improving the production efficiency of the entire light fixture. (2) It brings great convenience to the terminal electrician's operation. During installation, the electrician can first install the driver module 1 through the flexible bracket 2, connect the electric wires and conduits, and then connect the light module 3 with the driver module 1, greatly improving installation efficiency. Specifically, the driver module 1 is equipped with a first connector 13, and the light module 3 is equipped with a second connector that connects with the first connector of the driver module 1.

In some embodiments, as shown in FIG. 1 to FIG. 7, the first hook part includes a first insertion flexible piece 21 and a first limiting flexible piece 22. The first insertion flexible piece 21 has a first flexible bending portion 211, and the driver module 1 has a first connection port 11 for the first flexible bending portion 211 to hook into. After the first insertion flexible piece 21 is hooked with the driver module 1, it limits the driver module 1 in the first direction and the second direction. The first limiting flexible piece 22 is connected to the driver module 1 through a first limiting member, constituting a limitation of the driver module 1 in the third direction. The first direction, second direction, and third direction are mutually perpendicular, forming a three-dimensional coordinate system. The connection and limitation in three directions ensure the firmness of the connection between the flexible bracket 2, 201 and the driver module 1 and light module 3.

Regarding the explanation of the three directions, with the height direction of the light fixture as the Z-axis, and the directions on the horizontal plane of the light fixture as the X-axis and Y-axis, depending on the installation position and placement state of the driver module 1, the first direction can align with any of the X, Y, or Z directions, and the second and third directions are chosen from the other two positions.

Figure 1:
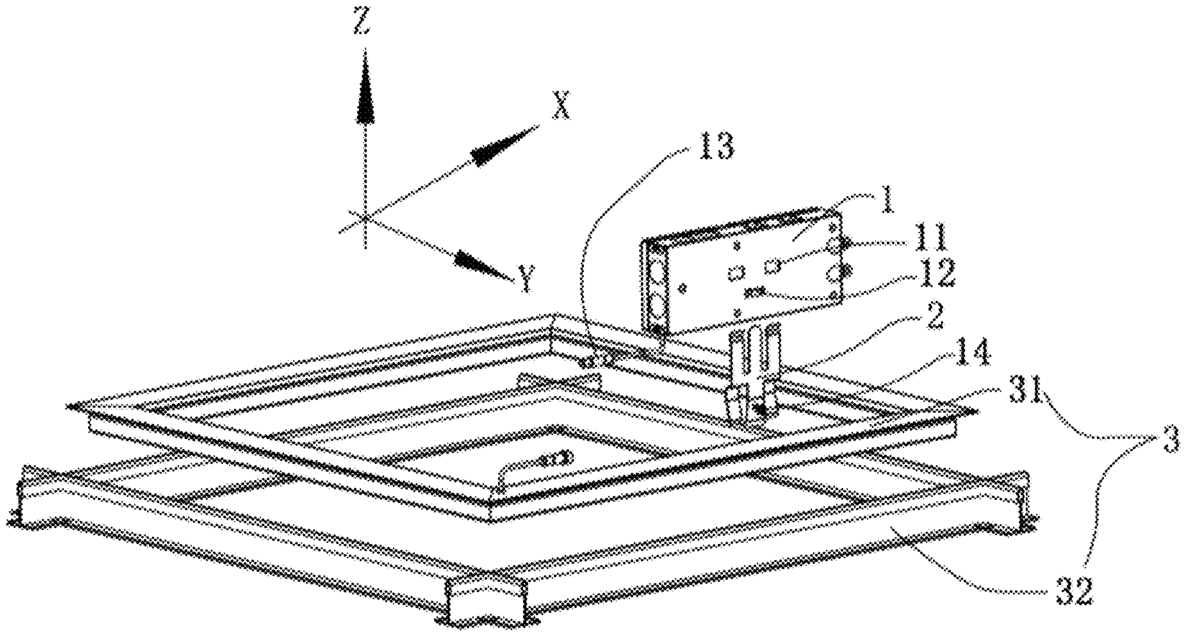
FIG. 1 illustrates an exploded diagram of a lighting apparatus embodiment.
Figure 2:
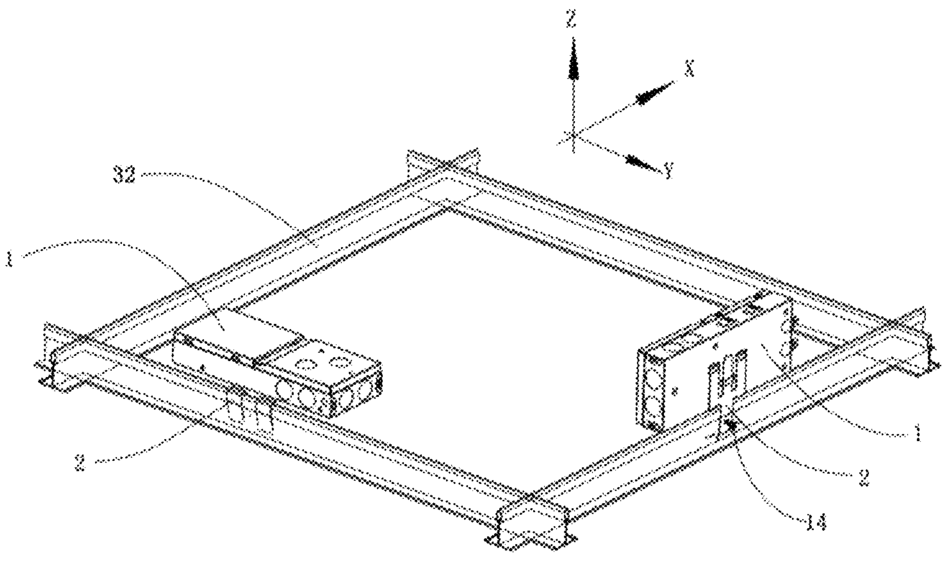
FIG. 2 illustrates a suspension grid frame example.

For example, in FIG. 1 and FIG. 2, the first direction is the X direction, the second direction is the Z direction, and the third direction is the Y direction.

The structure of the second hook part is the same as the structure of the first hook part, and the light module 3 has a second connection port.

Figure 3:
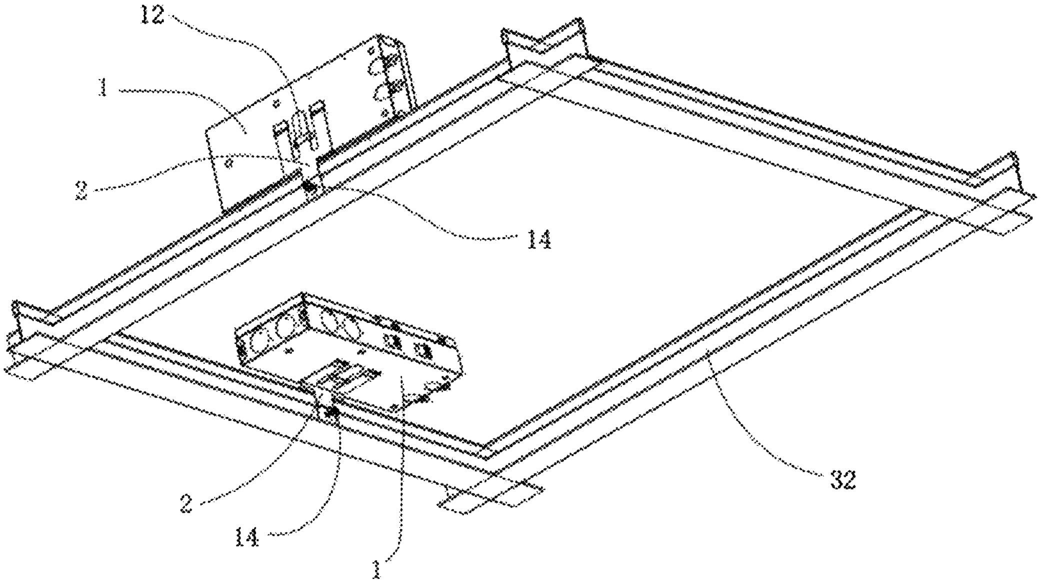
FIG. 3 illustrates another view of the example in FIG. 2.

In some embodiments, as shown in FIG. 1 to FIG. 3, the first limiting member is a guide band 12 fixed at both ends to the driver module 1, and the first limiting flexible piece 22 is inserted into the guide band 12. The guide band 12 and the driver module 1 form a guiding hole. During installation, the first limiting flexible piece 22 is inserted into the guiding hole as a guide, and the first flexible bending portion 211 on the flexible bracket 2, 201 can be hooked into the first connection port 11 on the driver module 1. Then, insert the second limiting flexible piece 24 into the guiding hole on the light module 3, and hook the second flexible bending portion into the second connection port on the light module 3. This installation is simple and convenient.

The length of the first limiting flexible piece 22 is greater than the length of the first insertion flexible piece 21 to facilitate the guidance of the flexible bracket 2, 201.

In some embodiments, as shown in FIG. 1 to FIG. 7, the first limiting member is a fastening screw 14. The second limiting flexible piece 24 has a first connection hole connected to the fastening screw 14, and the driver module 1 has a second connection hole connected to the fastening screw 14. Using the fastening screw 14 can securely fasten the flexible bracket 2, 201 to the T-bar 32, making the connection more secure.

Optionally, on the first hook part and second hook part, the fastening screw 14 and guide band 12 can be used separately or in combination. For example, the fastening screw 14 is used as a limiting member on the second limiting flexible piece 24.

The fastening screw 14 and flexible bending portion can also be used in combination or separately. For example, a fastening screw 14 can also be used for fixation on the first insertion flexible piece 21.

Figure 4:
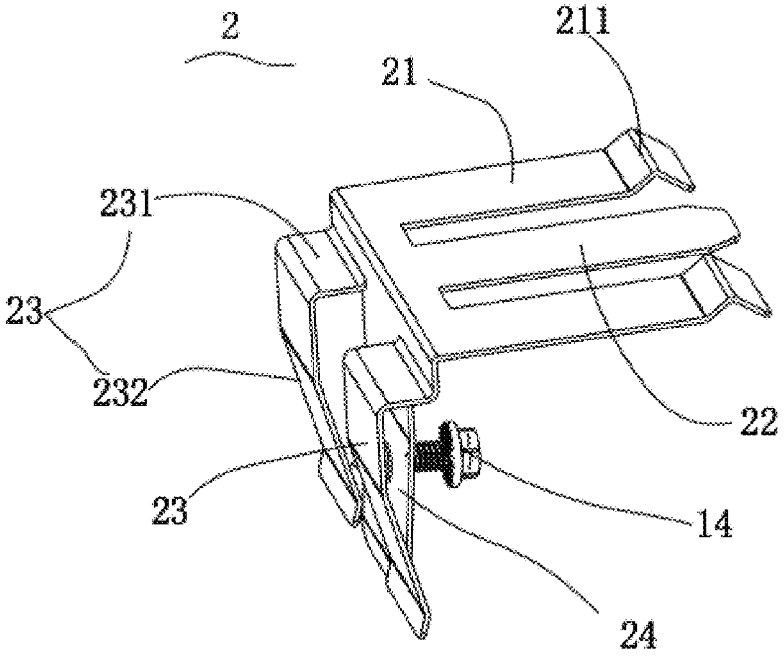
FIG. 4 illustrates an elastic bracket example.
Figure 5:
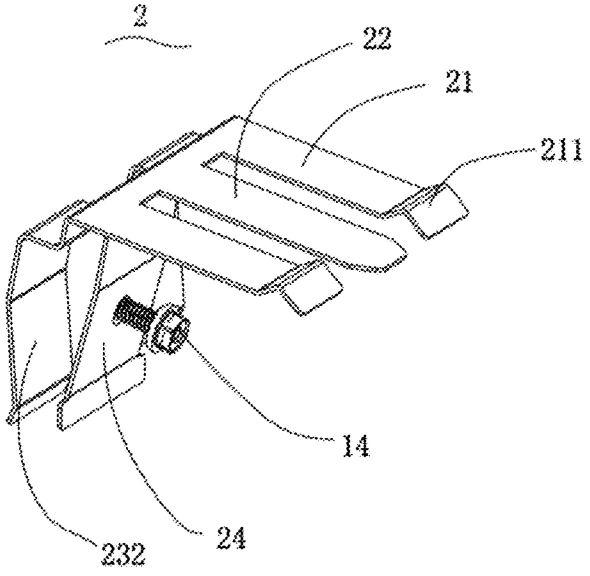
FIG. 5 illustrates another view of the example in FIG. 4.
Figure 7:
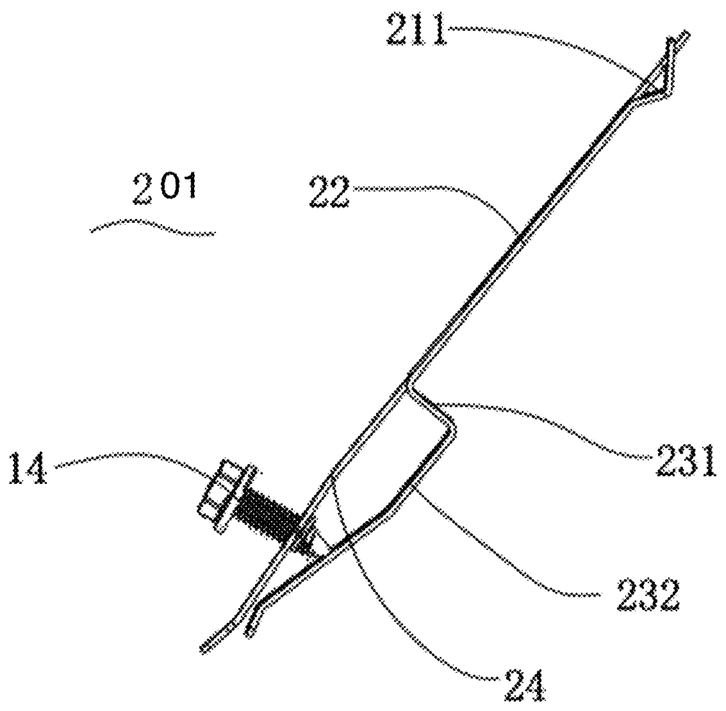
FIG. 7 illustrates another view of the example in FIG. 4.

In some embodiments, as shown in FIG. 4 and FIG. 7, the first hook part includes two first insertion flexible pieces 21 and one first limiting flexible piece 22, with the first limiting flexible piece 22 positioned between the two first insertion flexible pieces 21. This combination structure enhances the firmness of the connection between the flexible bracket 2, 201 and the driver module 1 and light module 3.

In some embodiments, as shown in FIG. 4 and FIG. 7, the first insertion flexible piece 21 and the first limiting flexible piece 22 are in the same plane. The first hook part connects to one plane of the driver module 1.

In some embodiments, as shown in FIG. 4 and FIG. 7, the second hook part includes two second insertion flexible pieces 23 and one second limiting elastic flexible piece 24, with the second limiting flexible piece 24 positioned between the two second insertion flexible pieces 23. After the second hook part is connected to the light module 3, the two second insertion flexible pieces 23 and the second limiting flexible piece 24 are arranged on the inner side and outer side of the light module 3, respectively. The second insertion elastic pieces 23 and the second limiting flexible piece 24 form an flexible clamping on both sides of the light module 3, enhancing the firmness of the connection between the flexible bracket 2, 201 and the light module 3.

Preferably, the second limiting flexible piece 24 is pre-connected to the light module 3 using a fastening screw 14. During the assembly process of the driver module 1 and light module 3, this can prevent the risk of the flexible bracket 2, 201 falling off from the light module 3, thus facilitating the installer's two-handed wiring and cable management operations.

When assembling the light fixture, the first limiting flexible piece 22 is guided through the guide hole set on the driver module 1, then the first insertion flexible piece 21 is snapped into the driver module 1, first assembling the driver module 1 and flexible bracket 2, 201 into one unit. Then, the second hook part is snapped into the hub T-bar 32 of the light module 3. When installing the second hook part, the flexible bracket 2, 201 is pre-attached to the light module 3 using a fastening screw 14 to prevent the flexible bracket 2, 201 from falling off the hub T-bar 32, thus allowing the electrician to conveniently perform two-handed wiring and cable management operations. After the driver module 1 is installed, finally, the connection between the light fixture and the driver can be achieved through DC plug-in connection.

The light module 3 has a light frame 31 and a hub T-bar 32, with the second hook part connected to the hub T-bar 32 and arranged on both sides of the hub T-bar 32.

In some embodiments, as shown in FIG. 4 and FIG. 7, the second insertion flexible piece 23 is divided into a connection segment 231 and an integrally connected hook-type flexible segment 232. The connection segment 231 is perpendicular to the second limiting flexible iece 24 and extends in a direction away from the second limiting flexible piece 24. The hook-type flexible segment 232 forms a triangular structure with the connection segment 231. Since the second insertion flexible piece 23 and the second limiting flexible piece 24 are distributed on both sides of the hub T-bar 32, which has a certain thickness, the connection segment 231 serves as a crossing section on the hub T-bar 32. The triangular structure formed by the hook-type flexible segment 232 and the connection segment 231 allows the hook-type flexible segment 232 to tightly and flexibly press against the hub T-bar 32, enhancing the firmness of the connection.

In some embodiments, as shown in FIG. 4 and FIG. 7, the first limiting flexible piece 22 and the second limiting flexible piece 24 form a right angle or are in a 180° plane. These two structural configurations of the flexible bracket 2, 201 can be chosen to connect the driver module 1 and light module 3 based on the placement position of the driver module 1.

In the above embodiments, the descriptions of each embodiment have their own focus. For parts not detailed or recorded in one embodiment, reference can be made to the relevant descriptions in other embodiments.

Based on the same inventive concept, this application also provides a lighting fixture that incorporates the aforementioned driver module installation structure.

The lighting fixture provided in this application embodiment features a separate design for the light module and driver module, connected by an flexible bracket. This reduces the overall height after stacking the light module and driver module, decreases the height of the packaging box, lowers packaging costs, reduces the volume of the packaging box, decreases the space occupied by the packaging box, and lowers transportation costs.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a suspension grid frame configured to be installed to a ceiling, wherein the suspension grid frame defines a light container;

a flexible bracket fixed to the suspension grid frame;

a driver module including a sidewall connector configured to be coupled to the flexible bracket, such that the driver module is fixed to the suspension grid frame, and wherein the sidewall connector is retained by the flexible bracket until a portion of the flexible bracket is deformed;

a light module configured to be installed into the light container after the driver module is attached to the suspension grid frame; and a first manual switch is provided on an external surface of the suspension grid frame, wherein the first manual switch is electrically connected to the drive module and configured to change a light setting for the driver module to drive the light module.

2. The lighting apparatus of claim 1, further comprising an antenna provided to the suspension grid frame, the antenna coupled to the driver module via the flexible bracket.

3. The lighting apparatus of claim 1, further comprising a power socket provided to the suspension grid frame for detachably connecting to an electronic device.

4. The lighting apparatus of claim 1, further comprising a power electrode provided on the suspension grid frame, wherein the light module is configured to be electrically connected to the driver module via the power electrode, when the light module is attached to the suspension grid frame.

5. The lighting apparatus of claim 1, further comprising a sliding track provided in the suspension grid frame, the sliding track configured for sliding the driver module to a lock position to connect to the flexible bracket.

6. The lighting apparatus of claim 1, further comprising a driver cable configured for detachably connecting the driver module to a light cable of the light module.

7. The lighting apparatus of claim 6, further comprising a plug end configured for coupling the driver cable to a socket end of the light module.

8. The lighting apparatus of claim 1, further comprising a signal path provided in the suspension grid frame, the signal path configured for routing a control signal of the driver module to another light module disposed in an adjacent suspension grid frame.

9. The lighting apparatus of claim 8, wherein the light module is configured to receive a wireless command to control multiple light modules at the same time.

10. The lighting apparatus of claim 1 further comprising a first hook part and a second hook part included in the bracket, the first and second hook parts configured to be separately attached to the sidewall connector.

11. The lighting apparatus of claim 10, wherein the first hook part comprises a first insertion piece with a first bending portion, and a first limiting piece; the structure of the second hook part is the same as the structure of the first hook part the driver module further including a first connection port for receiving the first bending portion, and the light module including a second connection port, wherein after the first insertion piece is coupled with the driver module, the driver module is limited in a first direction and a second direction; and the first limiting piece is configured to be connected to the driver module through a first limiting member, constituting a limitation of the driver module in a third direction; the first direction, the second direction, and the third direction are mutually perpendicular to form a three-dimensional coordinate system.

12. The lighting apparatus of claim 11, wherein the first limiting member is a guide band fixed at both ends to the driver module, and the first limiting piece is inserted through the guide band.

13. The lighting apparatus of claim 11, further including a first connection hole formed in the first limiting piece; and a second connection hole formed in the driver module, wherein the first limiting member is a fastening screw connected to the first connection hole and the second connection hole.

14. The lighting apparatus of claim 11, wherein the first hook part includes two first insertion pieces and one first limiting piece, and the first limiting piece is located between the two first insertion pieces.

15. The lighting apparatus of claim 14, wherein the first insertion piece and the first limiting piece are in the same plane.

16. The lighting apparatus of claim 11, wherein the second hook part includes two second insertion pieces and one second limiting piece, the second limiting piece is located between the two second insertion pieces; the second hook part configured such that the two second insertion pieces and the second limiting piece are arranged on the inner side and outer side of the light module, respectively, after the second hook part is connected to the light module.

17. The lighting apparatus of claim 16, wherein the second insertion piece is divided into a connection segment and an integrally connected hook-type segment, the connection segment is perpendicular to the second limiting piece and extends in a direction away from the second limiting piece, and the hook-type segment forms a triangular structure with the connection segment.

18. The lighting apparatus of claim 16, wherein the first limiting piece and the second limiting piece form a right angle or are in a plane.

* * * * *